United States Patent

Yoshioka et al.

Patent Number: 5,753,731
Date of Patent: May 19, 1998

[54] VISCOSITY CONDITIONER AND EMULSION AND EMULSION PAINT COMPOSITIONS

[75] Inventors: Toyotaro Yoshioka; Kaoru Komiya, both of Tokyo, Japan

[73] Assignee: Asahi Denka Kogyo K.K., Japan

[21] Appl. No.: 706,347

[22] Filed: Aug. 30, 1996

[30] Foreign Application Priority Data

Sep. 6, 1995 [JP] Japan ................ 7-229456
Sep. 6, 1995 [JP] Japan ................ 7-229458

[51] Int. Cl.$^6$ ............ C08K 5/205; B01J 13/00; C07C 269/02; C07C 271/10
[52] U.S. Cl. ........... 524/198; 252/312; 252/315.1; 526/932; 560/33; 560/166
[58] Field of Search ............. 252/312, 315.1; 524/198; 526/932; 560/155, 157, 166, 33

[56] References Cited

U.S. PATENT DOCUMENTS

| | | | |
|---|---|---|---|
| 3,639,258 | 2/1972 | Corino et al. | 252/315.1 |
| 3,708,445 | 1/1973 | Junas et al. | 526/932 X |
| 3,839,413 | 10/1974 | Wolff et al. | 252/312 X |
| 3,871,822 | 3/1975 | Goodman, Jr. et al. | 560/166 X |
| 3,996,154 | 12/1976 | Johnson et al. | 252/312 |
| 4,079,028 | 3/1978 | Emmons et al. | 524/507 |
| 4,163,088 | 7/1979 | Künzel et al. | 560/166 X |
| 5,013,787 | 5/1991 | Barron et al. | 526/932 X |
| 5,412,142 | 5/1995 | Wilkerson, III et al. | 560/166 X |

FOREIGN PATENT DOCUMENTS

0 639 595  2/1995  European Pat. Off. .

*Primary Examiner*—Richard D. Lovering
*Attorney, Agent, or Firm*—Wenderoth, Lind & Ponack

[57] ABSTRACT

A viscosity conditioner is disclosed which comprises a compound structured to have a group of the following formula (1)

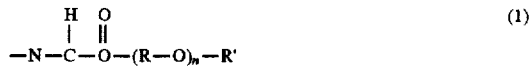

where R is a hydrocarbyl group, R' is a branched or secondary hydrocarbyl group, and n ranges from 1 to 500. The specified viscosity conditioner is conducive to reduced temperature dependence and hence constant viscosity in a certain range suited for all environmental conditions and good coatability at all seasons. Also disclosed are an emulsion composition and an emulsion paint composition, each of which include of the viscosity conditioner.

24 Claims, No Drawings

VISCOSITY CONDITIONER AND EMULSION AND EMULSION PAINT COMPOSITIONS

BACKGROUND OF THE INVENTION

1. Field of the Invention

This invention relates to novel viscosity conditioners as well as to an emulsion composition and an emulsion paint composition utilizing such a viscosity conditioner.

2. Description of the Related Art

A wide variety of viscosity builders are commonly known which are natural, semi-synthetic (carboxymethyl cellulose and the like) or synthetic in character. Also, there are many known reaction products obtained by reaction of polyoxyethylene glycol derivatives with aliphatic acid esters or epoxides.

Various other viscosity builders are also known as disclosed for instance in Japanese Patent Publication No. 52-25840, Japanese Patent Laid-Open No. 58-213074, Japanese Patent Publication No. 1-55292, Japanese Patent Publication No. 3-9151, Japanese Patent Publication No. 3-52766 and Japanese Patent Publication No. 4-55471. Such known viscosity builders, however, pose the problem that their viscosities are liable to change under ambient temperatures. For example, a paint formulated with a viscosity conditioner and a viscosity builder is necessarily susceptible, if by nature dependent on temperature, to varying viscosities at the time it is coated in summer and in winter. Especially in a geographical area like Japan where the four seasons clearly vary, the maximum temperature difference is frequently 30° to 40° C. between winter and summer seasons, so such viscosity changes with the seasons cause problems in the workability of the paint.

SUMMARY OF THE INVENTION

The present invention, therefore, has for its primary object to provide a viscosity conditioner which is less dependent on temperature, and thus, is highly capable of maintaining a constant range of viscosities suited for all environmental conditions and is adequately coatable throughout the year.

Another object of the invention resides in the provision of an emulsion composition and of an emulsion paint composition, each of which include the above viscosity conditioner.

To cope with the foregoing problems of the prior art, the present inventors have as a result of intensive research, developed a unique viscosity conditioner that has reduced temperature dependence, constant viscosity in a certain range to suit all environmental conditions and excellent coatability all the year round, coupled with an emulsion composition and an emulsion paint composition which each include of such viscosity conditioner.

In one aspect, the present invention provides a viscosity conditioner comprising a compound structured to have a group of the formula (1)

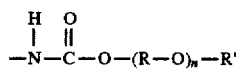
(1)

where R is a hydrocarbyl group, R' is a branched or secondary hydrocarbyl group, and n ranges from 1 to 500.

In another aspect, the invention provides an emulsion composition including such viscosity conditioner.

In a further aspect, the invention provides an emulsion paint composition including such viscosity conditioner.

DETAILED DESCRIPTION OF THE INVENTION

The viscosity conditioner according to the present invention is comprised of a compound having a group represented by the following formula (1)

(1)

where R, R' and n have the same meanings as defined above. The compound specified here is typified by those compounds which are represented by the formulae (2) and (3) below.

The formula (2) is as follows:

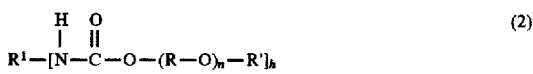
(2)

where R is a hydrocarbyl group, R' is a branched or secondary hydrocarbyl group, $R^1$ is a hydrocarbyl group which may have a urethane linkage, n ranges from 1 to 500, and h is not less than 1.

The formula (3) is as follows:

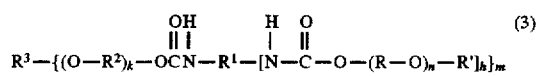
(3)

where R, $R^2$ and $R^3$ are each a hydrocarbyl group, R' is a branched or secondary hydrocarbyl group, $R^1$ is a hydrocarbyl group which may have an urethane linkage, n and k each range from 1 to 500, m is not less than 2, and h is not less than 1.

The compound of the formula (2) according to the present invention can be obtained by reacting one or more mono- or poly-isocyanates of $R^1$—(NCO)$_h$ and one or more polyether monoalcohols of R'—(O—R)$_n$—OH.

In such instance, the groups R, R' and $R^1$ in the formula (2) are determined depending on the compounds of $R^1$—(NCO)$_h$ and of R'—(O—R)$_n$—OH to be used.

No particular restriction is imposed upon the mono- or poly-isocyanates of an h valence and of $R^1$—(NCO)$_h$ for use in providing the viscosity conditioner of the present invention inasmuch as they have one or more isocyanate groups contained in their respective molecules. Here, the monoisocyanates and polyisocyanates include aliphatic monoisocyanates, aliphatic diisocyanates, aromatic monoisocyanates, aromatic diisocyanates, alicyclic monoisocyanates, alicyclic diisocyanates, biphenyl diisocyanates, phenylmethane diisocyanates, triisocyanates, tetraisocyanates and the like.

Aliphatic monoisocyanates useful for the present invention may be suitably chosen from methyl isocyanate, ethyl isocyanate, butyl isocyanate, propyl isocyanate, hexyl isocyanate, octyl isocyanate, lauryl isocyanate, octadecyl isocyanate and the like.

Suitable alicyclic monoisocyanates include cyclohexyl isocyanate and the like.

Suitable aromatic monoisocyanates include phenyl isocyanate, tolylene isocyanate and the like.

Aliphatic diisocyanates used herein are chosen from methylene diisocyanate, dimethylene diisocyanate, trimethylene diisocyanate, tetramethylene diisocyanate, pentamethylene diisocyanate, hexamethylene diisocyanate, dipropylether diisocyanate, 2,2-dimethylpentane di-isocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropylether diisocyanate, thiodihexyl diisocyanate, meta-xylylene diisocyanate, para-xylylene diisocyanate, tetramethylxylylene diisocyanate and the like.

Eligible aromatic diisocyanates include meta-phenylene diisocyanate, para-phenylene diisocyanate, 2,4-tolylene diisocyanate, 2,6-tolylene diisocyanate, di-methylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate and the like.

Eligible alicyclic diisocyanates include hydrogenated xylylene diisocyanate, isophorone diisocyanate and the like.

Eligible biphenyl diisocyanates include biphenyl diisocyanate, 3,3'-dimethylbiphenyl diisocyanate, 3,3'-dimethoxybiphenyl diisocyanate and the like.

Phenylmethane diisocyanates used herein are exemplified by diphenylmethane-4,4'-diisocyanate, 2,2'-dimethyldiphenylmethane-4,4'-diisocyanate, diphenyldimethylmethane-4,4'-diisocyanate, 2,5,2',5'-tetramethyl-diphenylmethane-4,4'-diisocyanate, cyclohexylbis(4-isocyanato phenyl)methane, 3,3'-dimethoxydiphenylmethane-4,4'-diisocyanate, 4,4'-dimethoxydiphenylmethane-3,3'-diisocyanate, 4,4'-diethoxydiphenylmethane-3,3'-diisocyanate, 2,2'-dimethyl-5,5'-dimethoxydiphenylmethane-4,4'-diisocyanate, 3,3'-dichlorodiphenyldimethylmethane-4,4'-diisocyanate, benzophenone-3,3'-diisocyanate and the like.

Triisocyanates used herein are chosen from 1-methylbenzene-2,4,6-triisocyanate, 1,3,5-trimethylbenzene-2,4,6-triisocyanate, 1,3,7-naphthalene triisocyanate, biphenyl-2,4,4'-triisocyanate, diphenylmethane-2,4,4'-tri-isocyanate, 3-methyldiphenylmethane-4,6,4'-triisocyanate, triphenylmethane-4,4',4''-triisocyanate, 1,6,11-undecane triisocyanate, 1,8-diisocyanate-4-isocyanate methyloctane, 1,3,6-hexamethylene triisocyanate, bicycloheptane triisocyanate, tris(isocyanatephenyl)thiophosphate and the like.

The polyisocyanate compounds exemplified above may be by nature dimeric or trimeric (isocyanurate-linked), or in the form of a biuret derived from reaction with an amine.

In addition, urethane linkage-containing polyisocyanates can be used which result from reacting either one of the above listed polyisocyanates with a polyol.

As polyols for use in that reaction, those of from divalence to octavalence are preferred and selected from divalent alcohols such as ethylene glycol, propylene glycol, butylene glycol, hexamethylene glycol, neopentyl glycol and the like, trivalent alcohols such as glycerin, trimethylolethane, trimethylolpropane and the like, tetravalent alcohols such as pentaerythritol and the like, pentavalent alcohols such as adonite, arabite, xylite and the like, heptavalent alcohols such as dipentaerythritol, sorbite, mannite, idite and the like, and octavalent alcohols such as sucrose and the like, and oligomers thereof, adducts thereof with alkylene oxides, adducts thereof with caprolactones and the like.

In preparing the viscosity conditioner of the formula (2) according to the present invention, the polyether monoalcohols of R'—(O—R)$_n$—OH are not particularly restrictive insofar as they are polyethers induced from branched or secondary monovalent alcohols. Such a compound can be derived from addition polymerization of a branched or secondary monovalent alcohol with an alkylene oxide such as ethylene oxide, propylene oxide, butylene oxide, epichlorohydrin or the like, a styrene oxide or the like.

The branched alcohol stated above is represented by the following formula (4).

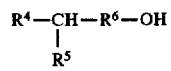

The above secondary alcohol is represented by the following formula (5).

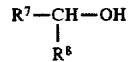

It is noted, therefore, that the group R' denotes a residue having removed a hydroxyl group in each of the formulae (4) and (5).

In the formulae (4) and (5), $R^4$ to $R^8$ are each a hydrocarbyl group selected for example from an alkyl group, an alkenyl group, an alkylaryl group, a cycloalkyl group, a cycloalkenyl group and the like.

Alkyl groups eligible for the present invention are chosen among from methyl, ethyl, propyl, isopropyl, butyl, isobutyl, tertiary butyl, pentyl, isopentyl, neopentyl, tertiary pentyl, hexyl, heptyl, octyl, 2-ethylhexyl, nonyl, decyl, undecyl, dodecyl, tridecyl, isotridecyl, myristyl, palmityl, stearyl, eicosyl, docosyl, tetracosyl, triacontyl, 2-octyldodecyl, 2-dodecylhexadecyl, 2-tetradecyloctadecyl, monomethyl branched-isostearyl groups and the like.

Suitable alkenyl groups include vinyl, allyl, propenyl, isopropenyl, butenyl, isobutenyl, pentenyl, isopentenyl, hexenyl, heptenyl, octenyl, nonenyl, decenyl, undecenyl, dodecenyl, tetradecenyl, oleyl groups and the like.

Suitable alkylaryl groups include phenyl, toluyl, xylyl, cumenyl, mesityl, benzyl, phenetyl, styryl, cinnamyl, benzhydryl, trityl, ethylphenyl, propylphenyl, butylphenyl, pentylphenyl, hexylphenyl, heptylphenyl, octylphenyl, nonylphenyl, alpha-naphthyl, beta-naphthyl groups and the like.

Cycloalkyl and cycloalkenyl groups used herein are exemplified by cyclopentyl, cyclohexyl, cycloheptyl, methylcyclopentyl, methylcyclohexyl, methylcycloheptyl, cyclopentenyl, cyclohexenyl, cycloheptenyl, methylcyclopentenyl, methylcyclohexenyl, methylcycloheptenyl groups and the like.

In the formula (4), the group $R^6$ is a hydrocarbyl group such as for example of an alkylene group, an alkenylene group, an alkylarylene group, a cycloalkylene group, a cycloalkenylene group or the like. A group —$CH_2$— is particularly suitable for use in the group $R^6$ since an alcohol branched at its 2-position is less dependent in viscosity on temperature.

In addition, an alkyl group is particularly preferred for the group R', and the carbon number in the R' group totals preferably from 8 to 36, more preferably from 12 to 24. More specifically, each of the groups $R^4$, $R^5$, $R^7$ and $R^8$ in the formulae (4) and (5) should preferably have 4 or more carbon atoms, thereby rendering the viscosity of the resultant branched or secondary alcohol less dependent on temperature.

The alkylene oxide, styrene oxide or the like may be bonded by homopolymerization, or by random or block polymerization of two or more such oxides. In this instance, any known method is suitable. The polymerization degree n is in the range of 1 to 500, preferably of 1 to 200, more preferably of 10 to 200. The proportion of the ethylene group to be occupied in the group R is preferably from 50 to 100% by weight, more preferably from 65 to 100% by weight, based on the total weight of the group R, and strict observance of this proportion leads to enhanced performance in viscosity modification.

The compound of the formula (2) may be prepared as is usually done with the reaction of a polyether with an isocyanate, for example, at 80° to 90° C. for 1 to 3 hours.

The viscosity conditioner of the formula (3) according to the present invention can be derived from reaction of one or more polyether polyols of $R^3$—$[(O-R^2)_k$—$OH]_m$, one or more polyisocyanates of $R^1$—$(NCO)_{h+1}$ and one or more polyether monoalcohols of $R'$—$(O-R)_n$—$OH$.

To conduct such reaction, the groups R, R', $R^1$, $R^2$ and $R^3$ are determined with the compounds of $R^3$—$[(O-R^2)_k$—$OH]_m$, of $R^1$—$(NCO)_{h+1}$ and of $R^1$—$(O-R)_n$—$OH$ to be used. Though not restrictive with respect to the ratio of the three such compounds to be fed, it is preferred that the ratio between polyether polyol-induced and polyether monoalcohol-induced hydroxyl groups and a polyisocyanate-induced isocyanate group be set to range from 0.8:1 to 1.4:1 in terms of NCO/OH.

In preparing the viscosity conditioner of the formula (3) according to the present invention, the polyether polyol compounds of $R^3$—$[(O-R^2)_k$—$OH]_m$ are not particularly limited insofar as they are composed of polyethers of m-valent alcohols. Such a compound can be prepared from addition polymerization of a polyol of an m valence with an alkylene oxide such as ethylene oxide, propylene oxide, butylene oxide, epichlorohydrin or the like, a styrene oxide or the like.

Polyols useful for that reaction are those of from divalence to octavalence, and their examples include divalent alcohols such as ethylene glycol, propylene glycol, butylene glycol, hexamethylene glycol, neopentyl glycol and the like, trivalent alcohols such as glycerin, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol, trimethylolethane, trimethylolpropane and the like, tetravalent alcohols such as pentaerythritol, 1,2,3,4-pentanetetrol, 2,3,4,5-hexanetetrol, 1,2,4,5-pentanetetrol, 1,3,4,5-hexanetetrol and the like, pentavalent alcohols such as adonite, arabite, xylite and the like, heptavalent alcohols such as dipentaerythritol, sorbite, mannite, idite and the like, and octavalent alcohols such as sucrose and the like.

The group $R^2$ is determined with the kind of alkylene oxides, styrene oxides or the like to be bonded. Alkylene oxides or styrene oxides of 2 to 4 carbon atoms are particularly preferable since they are easily available and highly conducive to excellent viscosity modification of the finished viscosity conditioner.

The alkylene oxide, styrene oxide or the like may be bonded to the group $R^2$ in conventional fashion by a mode of homopolymerization, or of block or random polymerization of two or more such oxides. The polymerization degree k is usually from 1 to 500, preferably from 1 to 200, more preferably from 10 to 200. The proportion of the ethylene group to be occupied in the group $R^2$ ranges preferably from 50 to 100% by weight, more preferably from 65 to 100% by weight, based on the total weight of the group $R^2$ so that excellent viscosity modification is attainable.

The compounds of $R^3$—$[(O-R^2)_k$—$OH]_m$ preferably have a molecular weight of 500 to 50,000, more preferably of 1,000 to 20,000.

In preparing the viscosity conditioner of the formula (3) according to the present invention, the polyisoyanates of $R^1$—$(NCO)_{h+1}$ are not particularly limited if they have two or more isocyanate groups in their molecules. These polyisocyanates are typified, as noted hereinabove with respect to the polyisocyanates for use in the formula (2), by aliphatic diisocyanates, aromatic diisocyanates, alicyclic diisocyanates, biphenyl diisocyanates, phenylmethane diisocyanates, triisocyanates, tetraisocyanates and the like.

Urethane linkage-containing polyisocyanate compounds may also be suitably employed which are obtained by reaction of a polyisocyanate selected from among the above listed polyisocyanates with a given polyol. Eligible polyols used here are those configured to be from divalent to octavalent in nature and described above in connection with the formula (3). Such an urethane-linked poly-isocyanate is preferable when a trivalent or higher polyvalent polyisocyanate is suitable as $R^1$—$(NCO)_{h+1}$.

In preparing the viscosity conditioner of the formula (3) according to the present invention, the polyether monoalcohols of $R'$—$(O-R)_n$—$OH$ are not particularly restricted if they are polyethers induced from monovalent alcohols of a branched or secondary type as specified above in the case with the formula (2).

The compound of the formula (3) can be prepared as is usually done with the reaction of a polyether with an isocyanate. For example, reaction temperatures may be at 80° to 90° C. with reaction times of 1 to 3 hours.

In the case where the polyether polyol (a) of $R^3$—$[(O-R^2)_k$—$OH]_m$, the polyisocyanate (b) of $R^1$—$(NCO)_{h+1}$ and the polyether monoalcohol (c) of $R'$—$(O-R)_n$—$OH$ are allowed to react with one another, some by-products tend to be formed which deviate from the structural formula (3). For example, use of a diisocyanate leads to the production of a compound of a c—b—a—b—c form as a main or desired product of the formula (3), often entailing formation of by-products such as a c—b—c form type compound, a c—b—(a—b)$_x$—a—b—c from compound and the like. In that instance, the compound of the formula (3) does not need to be isolated from the resultant reaction mixture containing such by-products; that is, the reaction mixture may be applied as produced and as a viscosity conditioner contemplated under the present invention.

The viscosity conditioner of the present invention, comprised of a compound having a specific group of the formula (1), provides those physical properties which have not been achieved with the foregoing viscosity builders of the prior art. For example, the viscosity conditioner of the invention is by nature nonionic, and though relatively low in molecular weight, it shows good viscosity increase even when added in a smaller amount to aqueous systems. It is moreover stable to water and to alcohol. In particular, upon application to emulsion paints, such viscosity conditioner is highly capable not only of bringing about a sufficient viscosity increase, but also of contributing in most cases to excellent fluidity and leveling properties and to outstanding performance of viscosity modification under both low- and high-sheared conditions.

Also, the viscosity conditioner of the present invention advantageously offers a specific property of temperature sensitivity that the prior art viscosity builders have failed to gain. Owing to the temperature sensitivity, the viscosity conditioner is less dependent on temperature, fully constant in a certain range of viscosities held for all environmental conditions and adequately coatable in all seasons. These advantages are peculiar to the present invention and due to the fact that the group R' in the formula (1) is specifically defined as a branched or secondary hydrocarbon group, namely, to the fact that a branched or secondary alcohol is selectively used as a starting material in providing the group R' of the formula (1).

The viscosity conditioner of the present invention is applicable to aqueous systems such as emulsions, latices, dispersible fluids (such as suspensions and dispersions) and the like.

Polymeric emulsions of a vinyl acetate type are chosen for example from homopolymer emulsions of a vinyl acetate monomer, and copolymer emulsions of a vinyl acetate monomer with a comonomer such as ethylene, vinyl chloride, acrylic acid, acrylate ester, methacrylic acid, methacrylate ester, veova, maleic acid, maleate ester or the like. Suitable polymeric emulsions of an acrylic type include homopolymer emulsions of a monomer such as acrylic acid, acrylate ester, methacrylic acid, methacrylate ester or acrylonitrile, copolymer emulsions of two or more such monomers, and copolymer emulsions of one such monomer with styrene. Suitable polymeric emulsions of a vinylidene type include homopolymer emulsions of a vinylidene chloride monomer, and copolymer emulsions of a vinylidene chloride monomer with a comonomer such as acrylic acid, acrylate ester, methacrylic acid, methacrylate ester, acrylonitrile, vinyl chloride or the like. Included in other suitable polymeric emulsions are urethane resin emulsions, silicone resin emulsions, epoxy resin emulsions and fluorine resin emulsions. Eligible latices are exemplified for example by SBR latex, SB latex, ABS latex, NBR latex, CR latex, VP latex, BR latex, MBR latex, IR latex and the like.

When dissolved or dispersed in water, the viscosity conditioner of the present invention can produce its effects of viscosity modification and may be used usually in an amount of 0.01 to 10%, preferably of 0.01 to 5%, based on the solid content of a given polymeric emulsion or on the total weight of a given latex. To the emulsion or latex may be added the viscosity conditioner as it is, or after it is diluted to a suitable viscosity with water or solvent. For use in emulsion paints, the viscosity conditioner of the invention may be incorporated as an aqueous solution in ethyl alcohol at a kneading stage or at a modifying stage of such an emulsion paint, whereby workability is facilitated with the viscosity conditioner added in an amount of 0.01 to 5%.

The polymeric emulsions stated above can be prepared by the use of one or more anionic, cationic or nonionic emulsifiers. Two or more emulsifiers may be employed as admixed with one another irrespective of their types. The amount of the emulsifier to be used is from about 0.1 to 6% by weight based on the total weight of a selected monomer and may in some cases be larger than 6% by weight. Frequently, where an initiator of a persulfate salt type is employed, no emulsifiers may be needed. The average molecular weights of those emulsion polymers are generally from about $1 \times 10^5$ to $1 \times 10^7$ and mostly above $5 \times 10^5$.

The viscosity conditioner of the present invention is nonionic in nature and thus effective also for polymeric emulsions of an alkaline class. Such viscosity conditioner may be added to such an emulsion together with a defoamer, a pigment dispersant and a surfactant. The viscosity conditioner may also contain or may subsequently be mixed with various other additives such as antioxidants, ultraviolet absorbers, water-proofing agents, anti-septic agents, bactericides, dispersants, anti-foaming agents, deodorizers, perfumes, extenders, dyes, pigments and the like.

Other aqueous systems suitable for the viscosity conditioner of the present invention are aqueous paint compositions for use in the paper, leather and textile industries, detergents, adhesives, waxes, polishing agents, cosmetics and toiletry goods, pharmaceuticals, agricultural chemicals and agricultural compositions.

As discussed hereinabove, a novel viscosity conditioner, an emulsion composition and an emulsion paint composition each including of such viscosity conditioner are provided in accordance with the present invention.

EXAMPLES

With reference to Production Examples 1 to 9 and Examples 1 to 4 of the viscosity conditioner represented above by the formula (2), the present invention will be described below in greater detail.

Production Example 1

Into a 4-necked flask of 1,000 ml in volume equipped with a thermometer, a nitrogen inlet and a stirrer was charged 660 parts by weight of an adduct of a branched alcohol of the formula

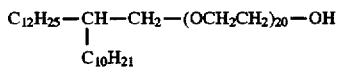

with 20 mols of ethylene oxide (EO). The reactive system was dehydrated in vacuo (below 10 mm Hg) at 90° to 100° C. for 3 hours until the moisture in the system was reduced to 0.03%. On subsequent cooling of the system to 80° C., 47.0 parts by weight of hexamethylene diisocyanate (HMDI) was placed in the flask. Reaction was then effected in a nitrogen stream at 80° to 90° C. for 2 hours, after which the isocyanate content was confirmed to be nil. Thus, a reaction product of the invention was obtained which was a pale yellowish solid at normal temperature. This product is hereunder called Viscosity Conditioner 1 (R: ethylene group; R': 2-decyltetradecyl group; $R^1$: hexamethylene group; h=2; n=20).

Production Example 2

The process for Production Example 1 was followed except that 690 parts by weight of an adduct of a secondary alcohol of 11 to 14 carbon atoms with 100 mols of EO, and 10.5 parts by weight of tetramethylene diisocyanate were used. Thus, a pale yellowish solid product was obtained. This product is called Viscosity Conditioner 2 (R: ethylene group; R': mixture of the formula

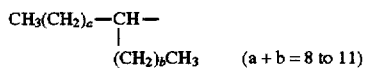

$R^1$: tetramethylene group; h=2; n=100).

Production Example 3

The process for Production Example 1 was followed except that 133 parts by weight of an adduct of a branched alcohol of the formula

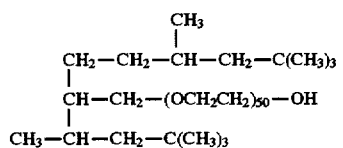

with 50 mols of EO, and 20.4 parts by weight of HMDI were used. Thus, a pale yellowish solid product was obtained. This product is called Viscosity Conditioner 3 (R: ethylene group; $R^1$: hexamethylene group; h=2; n=50).

Production Example 4

The process for Production Example 1 was followed except that 167 parts by weight of an adduct of a branched alcohol of the formula

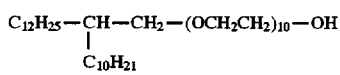

with 10 mols of EO, 504 parts by weight of an adduct of a secondary alcohol of 11 to 14 carbon atoms with 100 mols of EO, and 36.5 parts by weight of tolylene diisocyanate (TDI) were used. Thus, a pale yellowish solid product was obtained. This product is called Viscosity Conditioner 4 (R: ethylene group; R': mixture of 2-decyltetradecyl group and same group as in Production Example 2; $R^1$: tolylene group; h=2; n=10).

Production Example 5

The process for Production Example 1 was followed except that use was made of 656 parts by weight of an adduct of a branched alcohol of the formula

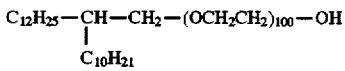

with 100 mols of EO, and 48.0 parts by weight of a triisocyanate derived by reacting 1 mol of trimethylolpropane and 3 mols of TDI. Thus, a pale yellowish solid product was obtained. This product is called Viscosity Conditioner 5 (R: ethylene group; R': 2-decyltetradecyl group; $R^1$: trimethylolpropane-TDI moiety; h=3; n=100).

Production Example 6

The process for Production Example 1 was followed except that 625 parts by weight of an adduct of a branched alcohol of the formula

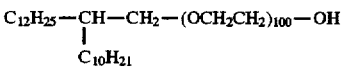

with 100 mols of EO, and 12.7 parts by weight of tolylene isocyanate were used. Thus, a pale yellowish solid product was obtained. This product is called Viscosity Conditioner 6 (R: ethylene group; R': 2-decyltetradecyl group; $R^1$: toluyl group; h=1; n=100).

Production Example 7

The process for Production Example 1 was followed except that use was made of 662 parts by weight of an adduct of a branched alcohol of the formula

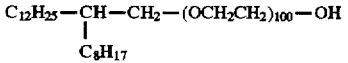

with 100 mols of EO, and 30.0 parts by weight of a triisocyanate prepared by reacting 1 mol of trimethylolpropane and 3 mols of HMDI. Thus, a pale yellowish solid product was obtained. This product is called Viscosity Conditioner 7 (R: ethylene group; R': 2-decyltetradecyl group; $R^1$: tri-methylolpropane-HMDI moiety; h=3; n=100).

Production Example 8

The process for Production Example 1 was followed except that use was made of 634 parts by weight of an adduct of a secondary alcohol of 11 to 14 carbon atoms with 50 mols of EO, and 55.4 parts by weight of a tetravalent isocyanate prepared by reacting 1 mol of pentaerythritol and 4 mols of TDI. Thus, a pale yellowish solid product was obtained. This product is called Viscosity Conditioner 8 (R: ethylene group;
R': same group as in Production Example 2; $R^1$: pentaerythritol-TDI moiety; h=4; n=50).

Production Example 9

The process for Production Example 1 was followed except that use was made of 665 parts by weight of an adduct of a branched alcohol of the formula

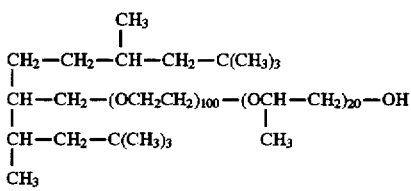

with 100 mols of EO and also with 20 mols of propylene oxide (PO), and 25.7 parts by weight of a hexavalent isocyanate derived by reacting 1 mol of dipentaerythritol and 6 mols of xylylene diisocyanate. Thus, a pale yellowish solid product was obtained. This product is called Viscosity Conditioner 9 (R: ethylene group, propylene group; $R^1$: dipentaerythritol-xylylene diisocyanate moiety; h=6; n=100, 20).

Comparative Production Example 1

Into a 4-necked flask of 1,000 ml in volume equipped with a thermometer, a nitrogen inlet and a stirrer was charged 668 parts by weight of an adduct of lauryl alcohol with 50 mols of EO. The reactive system was dehydrated in vacuo (below 10 mm Hg) at 90° to 100° C. for 3 hours until the moisture in the system was lowered to 0.03%. On cooling of the reactive system to 80° C., 23.5 parts by weight of HMDI was put into the flask. Reaction was then effected in a nitrogen stream at 80° to 90° C. for 2 hours, after which the isocyanate content was confirmed to be nil. Thus, a comparative reaction product was obtained which was a pale yellowish solid at normal temperature. This product is hereunder called Comparative Product 1.

Comparative Production Example 2

The process for Comparative Production Example 1 was followed except that use was made of 665 parts by weight of an adduct of nonylphenol with 100 mols of EO, and 30.6 parts by weight of a triisocyanate derived by reacting 1 mol of tri-methylolpropane and 3 mols of HMDI. Thus, a pale yellowish solid product was obtained. This product is called Comparative Product 2.

Comparative Production Example 3

The process for Comparative Production Example 1 was followed except that 655 parts by weight of an adduct of decyl alcohol with 50 mols of EO, and 37.8 parts by weight of TDI were used. Thus, a pale yellowish solid product was obtained. This product is called Comparative Product 3.

An amount of 40 parts by weight of each of Viscosity Conditioners 1 to 9 representative of the present invention and of Comparative Products 1 to 3 was uniformly mixed with 10 parts by weight of butyl Cellosolve (ethylene glycol monobutyl ether) and 50 parts by weight of water so that there was provided a transparent liquid composition, namely each of Compositions 1 to 9 and of Comparative Composition 1 to 3. The viscosities of these test compositions are indicated below.

Composition 1: about 2,000 cPs
Composition 2: about 4,000 cPs
Composition 3: about 2,500 cPs
Composition 4: about 2,000 cPs
Composition 5: about 6,000 cPs
Composition 6: about 3,500 cPs
Composition 7: about 5,500 cPs
Composition 8: about 4,500 cPs
Composition 9: about 7,500 cPs
Comparative Composition 1: about 4,000 cPs
Comparative Composition 2: about 6,000 cPs
Comparative Composition 3: about 2,000 cPs Example 1

Evaluation with Emulsions

| Formulation: | |
|---|---|
| emulsion (for gloss coating; acrylate ester type; commercially available) | 100.0 g |
| viscosity conditioner (each of inventive and comparative products; aqueous solution of 10% in solid content) | 0.5 g |
| anti-foaming agent (Adekanate B-940; mineral oil type; Asahi Denka Kogyo K.K.) | 0.2 g |

The above formulation was hand-stirred for 5 minutes, followed by mechanical stirring (at 1,000 rpm). After being allowed to stand for 2 hours at each of certain selected temperatures (5°, 25° and 40° C.), the viscosities of the resulting emulsion compositions, inventive compositions 1 to 9 and comparative compositions 1 to 3, were measured. The measurements are made under the set of conditions given below:

viscometer: BM viscometer
rotor: No. 4
revolution: 12 rpm

The test results are shown in Table 1.

TABLE 1

| viscosity conditioner | 5° C. (cPs) | 25° C. (cPs) | 40° C. (cPs) | 40° C./5° C. |
|---|---|---|---|---|
| Composition 1 | 8,100 | 7,800 | 7,600 | 0.94 |
| Composition 2 | 3,300 | 2,900 | 2,800 | 0.85 |
| Composition 3 | 9,000 | 8,800 | 8,500 | 0.94 |
| Composition 4 | 5,200 | 4,800 | 4,600 | 0.88 |
| Composition 5 | 7,000 | 6,500 | 6,100 | 0.87 |
| Composition 6 | 8,200 | 8,800 | 8,000 | 0.98 |
| Composition 7 | 11,500 | 10,300 | 10,100 | 0.88 |
| Composition 8 | 5,800 | 5,800 | 5,400 | 0.93 |
| Composition 9 | 3,100 | 2,700 | 2,400 | 0.77 |
| Comparative Composition 1 | 4,000 | 2,800 | 800 | 0.20 |
| Comparative Composition 2 | 6,300 | 2,100 | 630 | 0.10 |
| Comparative Composition 3 | 8,200 | 3,800 | 1,100 | 0.13 |

The above testing was repeated except that use was made of a different emulsion for use in elastic coating (styrene-acrylate ester type; commercially available) and a different grade of anti-foaming agent (Adekanate B-190; silicone type; Asahi Denka Kogyo K.K.). The results are listed in Table 2.

TABLE 2

| viscosity conditioner | 5° C. (cPs) | 25° C. (cPs) | 40° C. (cPs) | 40° C./5° C. |
|---|---|---|---|---|
| Composition 1 | 15,000 | 14,500 | 13,300 | 0.89 |
| Composition 2 | 12,000 | 11,300 | 11,000 | 6.92 |
| Composition 3 | 20,000 | 19,800 | 19,600 | 0.98 |
| Composition 4 | 18,000 | 17,800 | 16,800 | 0.93 |
| Composition 5 | 25,000 | 23,500 | 23,100 | 0.92 |
| Composition 6 | 31,000 | 30,800 | 30,000 | 0.97 |
| Composition 7 | 41,000 | 39,800 | 38,500 | 0.94 |
| Composition 8 | 33,000 | 31,600 | 31,600 | 0.96 |
| Composition 9 | 53,100 | 53,100 | 52,500 | 0.99 |
| Comparative Composition 1 | 19,900 | 10,800 | 5,500 | 0.28 |
| Comparative Composition 2 | 40,300 | 20,300 | 5,900 | 0.15 |
| Comparative Composition 3 | 38,500 | 16,000 | 6,800 | 0.18 |

Example 2

Evaluation with Elastic Paints

| Formulation: | |
|---|---|
| water | 90 parts by weight |
| viscosity conditioner (each of inventive and comparative products) | 70 parts by weight |
| pigment dispersant (25% polycarboxylic acid type) | 10 parts by weight |
| anti-freeze agent (ethylene glycol) | 20 parts by weight |
| anti-foaming agent (Adekanate B-940; Asahi Denka Kogyo K.K.) | 2 parts by weight |
| titanium oxide | 140 parts by weight |
| calcium carbonate | 160 parts by weight |

The mixture thus formulated was stirred for 24 hours and eventually used as a mill base. This base was then formulated as below.

| Formulation: | |
|---|---|
| mill base | 493 parts by weight |
| emulsion (for elastic coating; styrene-acrylate ester type; available in commerce) | 410 parts by weight |
| anti-foaming agent (Adekanate B-190) | 3 parts by weight |

Stirring was done for 5 hours, and each of the finished paints was let to stand for 2 hours at three different temperatures (5°, 25° and 40° C.) and then checked for viscosities under the following set of conditions:

viscometer: BM viscometer
rotor: No. 4
revolution: 30 rpm

The results are shown in Table 3.

TABLE 3

| viscosity conditioner | 5° C. (cPs) | 25° C. (cPs) | 40° C. (cPs) | 40° C./5° C. |
|---|---|---|---|---|
| Composition 1 | 25,600 | 24,500 | 22,900 | 0.89 |
| Composition 2 | 18,700 | 17,500 | 16,300 | 0.87 |
| Composition 3 | 35,200 | 33,300 | 32,000 | 0.91 |
| Composition 4 | 18,700 | 16,500 | 15,000 | 0.80 |
| Composition 5 | 35,000 | 34,000 | 33,600 | 0.96 |
| Composition 6 | 53,300 | 53,300 | 51,800 | 0.97 |

TABLE 3-continued

| viscosity conditioner | 5° C. (cPs) | 25° C. (cPs) | 40° C. (cPs) | 40° C./5° C. |
|---|---|---|---|---|
| Composition 7 | 62,800 | 62,300 | 62,300 | 0.99 |
| Composition 8 | 48,500 | 48,000 | 47,800 | 0.99 |
| Composition 9 | 73,300 | 73,300 | 73,300 | 1.00 |
| Comparative Composition 1 | 28,800 | 15,700 | 9,400 | 0.33 |
| Comparative Composition 2 | 17,800 | 8,500 | 1,300 | 0.07 |
| Comparative Composition 3 | 53,600 | 21,100 | 5,800 | 0.11 |

As is clear from Examples 1 and 2 above, Viscosity Conditioners 1 to 9 according to the present invention have proved to provide emulsions which are less susceptible to viscosity changes with temperature. The reason behind this benefit is that such viscosity conditioners were produced by the use of a selected class of branched or secondary alcohols as starting materials with consequential bonding of a branched chain or a secondary hydrocarbon chain to the group R'. On the other hand, Comparative Products 1 to 3 in common use revealed marked changes in the viscosities with temperatures since the products were derived from use of straight alcohols as starting materials and hence were so structured as to be terminated by a straight hydrocarbon chain.

Example 3

Color Toning and Water Resistance with Emulsions

Subsequently, the following testing was conducted to evaluate the performance of the viscosity conditioner of the present invention as applied to a certain emulsion paint.

| Formulation: | |
|---|---|
| emulsion (acrylate ester type) | 40.0 g |
| black pigment | 0.8 g |
| anti-foaming agent (Adekanate B-940) | 0.1 g |

Hand mixing of this formulation was done for 1 minute, followed by homogenization through mechanical stirring with a large turbine impeller for 10 to 20 minutes at 1,000 to 2,000 rpm. The resultant emulsion was coated over a slate plate.

Color toning was adjudged in respect of any appreciable color changes at three points of the emulsion, i.e., (1) wet-on-wet coating, (2) coated surface texture upon finger rubbing and (3) coat sagging, as compared to the coated surface obtained with a single coating.

Water resistance was determined by inspecting the state of the coat after being immersed in a warm water of 50° C. for 24 hours.

The results are listed in Table 4 in which the symbol "o" is taken as "not different", "Δ" as "slightly different" and "x" as "largely different".

TABLE 4

| viscosity conditioner | color tone | | | water resistance |
|---|---|---|---|---|
| | point 1 | point 2 | point 3 | |
| Composition 1 | o | o | o | not different |
| Composition 2 | o | o | o | not different |
| Composition 3 | o | o | o | not different |
| Composition 4 | o | o | o | not different |
| Composition 5 | o | o | o | not different |
| Composition 6 | o | o | o | not different |
| Composition 7 | o | o | o | not different |
| Composition 8 | o | o | o | not different |
| Composition 9 | o | o | o | not different |
| Comparative Composition 1 | Δ | x | x | slightly blistered |
| Comparative Composition 2 | Δ | o | x | greatly blistered |
| Comparative Composition 3 | x | Δ | o | greatly blistered |

Example 4

Color Toning and Water Resistance with Paints

| Formulation: | |
|---|---|
| paint used in Example 2 | 40.0 g |
| black pigment | 0.8 g |
| anti-foaming agent (Adekanate B-940) | 0.1 g |

Hand mixing of this formulation was done for 1 minute, followed by homogenization through mechanical stirring with a large turbine impeller for 10 to 20 minutes at 1,000 to 2,000 rpm. The resultant emulsion was coated over a slate plate.

Color toning was adjudged in respect of any appreciable color changes at three points of the emulsion, i.e., (1) wet-on-wet coating, (2) coated surface texture upon finger rubbing and (3) coat sagging, as compared to the coated surface obtained with a single coating.

Water resistance was determined by inspecting the state of the coat after being immersed in a warm water of 50° C. for 24 hours.

The results are listed in Table 5 in which the symbol "o" is taken as "not different", "Δ" as "slightly different" and "x" as "largely different".

TABLE 5

| viscosity conditioner | color tone | | | water resistance |
|---|---|---|---|---|
| | point 1 | point 2 | point 3 | |
| Composition 1 | o | o | o | not different |
| Composition 2 | o | o | o | not different |
| Composition 3 | o | o | o | not different |
| Composition 4 | o | o | o | not different |
| Composition 5 | o | o | o | not different |
| Composition 6 | o | o | o | not different |
| Composition 7 | o | o | o | not different |
| Composition 8 | o | o | o | not different |
| Composition 9 | o | o | o | not different |
| Comparative Composition 1 | x | Δ | o | slightly blistered |
| Comparative Composition 2 | o | x | Δ | slightly blistered |

TABLE 5-continued

| viscosity conditioner | color tone point 1 | point 2 | point 3 | water resistance |
|---|---|---|---|---|
| Comparative Composition 3 | x | x | Δ | greatly blistered |

As demonstrated by Examples 3 and 4 above, Viscosity Conditioners 1 to 9 of the present invention have excellent physical properties suited for use as viscosity conditioners for emulsion paints.

Now, the viscosity conditioner of the formula (3) according to the present invention will be illustrated with reference to Production Examples 10 to 24 and Examples 5 to 8 together with Comparative Production Examples 4 to 8.

Production Example 10

Into a 4-necked flask of 1,000 ml in volume equipped with a thermometer, a nitrogen inlet and a stirrer were charged 480 parts by weight of polyethylene glycol (PEG) 6000 (molecular weight: 6,000), and 198 parts by weight of an adduct of a branched alcohol of the formula

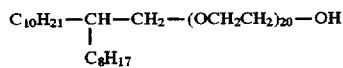

with 20 mols of ethylene oxide (EO). The reactive system was dehydrated in vacuo (below 10 mm Hg) at 90° to 100° C. for 3 hours until the moisture in the system was reduced to 0.03%. On subsequent cooling of the reactive system to 80° C., 29.6 parts by weight of hexamethylene diisocyanate (HMDI) was placed in the flask. Reaction was then effected in a nitrogen stream at 80° to 90° C. for 2 hours, after which the isocyanate content was confirmed to be nil. Thus, a reaction product of the invention was obtained which was a pale yellowish solid at normal temperature. This product is hereunder called Viscosity Conditioner 10 (R: ethylene group; R': 2-octyldodecyl group; $R^1$: hexamethylene group; $R^2$: ethylene group; $R^3$: ethylene group; h=1; m=2; k=67; n=20).

Production Example 11

The process for Production Example 10 was followed except that 522 parts by weight of PEG 6000, 145 parts by weight of an adduct of a branched alcohol of the formula

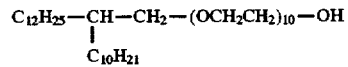

with 10 mols of EO, and 32.2 parts bt weight of HMDI were used. Thus, a pale yellowish solid product was obtained. This product is called Viscosity Conditioner 11 (R: ethylene group; R': 2-decyltetradecyl group; $R^1$: hexamethylene group; $R^2$: ethylene group; $R^3$: ethylene group; h=1; m=2; k=67; n=10).

Production Example 12

The process for Production Example 10 was followed except that 580 parts by weight of PEG 20000, 109 parts by weight of an adduct of a branched alcohol of the formula

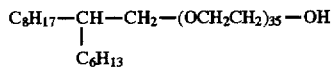

with 35 mols of EO, and 11.1 parts by weight of tolylene di-isocyanate (TDI) were used. Thus, a pale yellowish solid product was obtained. This product is called Viscosity Conditioner 12 (R: ethylene group; R': 2-hexyldecyl group; $R^1$: tolylene group; $R^2$: ethylene group; $R^3$: ethylene group; h=1; m=2; k=226; n=35).

Production Example 13

The process for Production Example 10 was followed except that 360 parts by weight of PEG 6000, 303 parts by weight of an adduct of a secondary alcohol of 11 to 14 carbon atoms with 50 mols of EO, and 22.2 parts by weight of HMDI were used. Thus, a pale yellowish solid product was obtained. This product is called Viscosity Conditioner 13 (R: ethylene group; R': compound of the formula

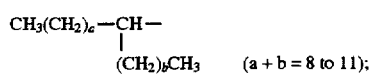

$R^1$: hexamethylene group; $R^2$: ethylene group; $R^3$: ethylene group; h=1; m=2; k=67; n=50).

Production Example 14

The process for Production Example 10 was followed except that 120 parts by weight of PEG 2000, 315 parts by weight of an adduct of a secondary alcohol of 11 to 14 carbon atoms with 100 mols of EO, and 18.5 parts by weight of tetramethylene diisocyanate were used. Thus, a pale yellowish solid product was obtained. This product is called Viscosity Conditioner 14 (R: ethylene group; R': same group as in Production Example 13; $R_1$: tetramethylene group; $R_2$: ethylene group; $R^3$: ethylene group; h=1; m=2; k=22; n=100).

Production Example 15

The process for Production Example 10 was followed except that 550 parts by weight of PEG 10000, 133 parts by weight of an adduct of a branched alcohol of the formula

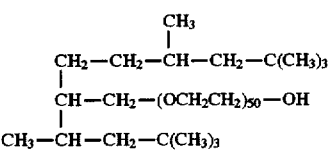

with 50 mols of EO, and 20.4 parts by weight of HMDI were used. Thus, a pale yellowish solid product was obtained. This product is called Viscosity Conditioner 15 (R: ethylene group; $R^1$: hexamethylene group; $R^2$: ethylene group; $R^3$: ethylene group; h=1; m=2; k=112; n=50).

Production Example 16

The process for Production Example 10 was followed except that 367 parts by weight of an adduct of trimethylolpropane with 100 mols of EO, 286 parts by weight of an adduct of a branched alcohol of the formula

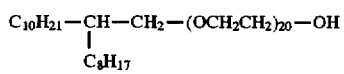

with 20 mols of EO, and 40.8 parts by weight of HMDI were used. Thus, a pale yellowish solid product was obtained. This product is called Viscosity Conditioner 16 (R: ethylene group; R': 2-octyldodecyl group; $R^1$: hexamethylene group; $R^2$: ethylene group; $R^3$: trimethylolpropane moiety; h=1; m=3; k=100; n=20).

Production Example 17

The process for Production Example 10 was followed except that 603 parts by weight of a compound of the formula

82.7 parts by weight of a compound of the formula

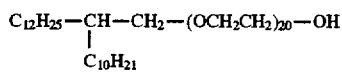

and 11.3 parts by weight of HMDI were used. Thus, a pale yellowish solid product was obtained. This product is called Viscosity Conditioner 17 (R: ethylene group; R': 2-decyltetradecyl group; $R^1$: hexamethylene group; $R^2$: $(C_3H_6O)_{15}$—$(C_2H_4O)_{80}$; $R^3$: propylene group; h=1; m=2; n=20).

Production Example 18

The process for Production Example 10 was followed except that 429 parts by weight of an adduct of pentaerythritol with 50 mols of EO, 226 parts by weight of an adduct of a branched alcohol of the formula

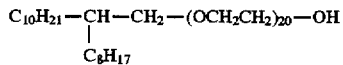

with 20 mols of EO, and 36.5 parts by weight of xylylene diisocyanate were used. Thus, a pale yellowish solid product was obtained. This product is called Viscosity Conditioner 18 (R: ethylene group; R': 2-octyldodecyl group; $R^1$: xylylene group; $R^2$: ethylene group; $R^3$: pentaerythritol moiety; h=1; m=4; k=50; n=20).

Production Example 19

The process for Production Example 10 was followed except that 435 parts by weight of an adduct of dipentaerythritol with 35 mols of EO, 257 parts by weight of an adduct of a branched alcohol of the formula

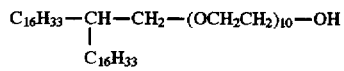

with 10 mols of EO, and 48.6 parts by weight of TDI were used. Thus, a pale yellowish solid product was obtained. This product is called Viscosity Conditioner 19 (R: ethylene group; R': 2-hexadecyloctadecyl group; $R^1$: tolylene group; $R^2$: ethylene group; $R^3$: dipentaerythritol moiety; h=1; m=6; k=35; n=10).

Production Example 20

The process for Production Example 10 was followed except that 431 parts by weight of an adduct of trimethylolpropane with 100 mols of EO and also with 50 mols of propylene oxide (PO), 214 parts by weight of a compound of the formula

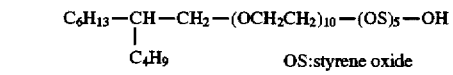

and 30.6 parts by weight of TDI were used. Thus, a pale yellowish solid product was obtained. This product is called Viscosity Conditioner 20 (R: ethylene group; R': 2-butyloctyl group; $R^1$: tolylene group; $R^2$: $(C_2H_4O)_{100}$—$(C_3H_6O)_{50}$; $R^3$: trimethylolpropane moiety; h=1; m=3; k=100, 50; n=10, 5).

Production Example 21

The process for Production Example 10 was followed except that 540 parts by weight of a compound of the formula $$HO—(C_2H_4O)_{110}—(C_3H_6O)_{43}—(C_2H_4O)_{110}—H$$

133 parts by weight of a compound of the formula

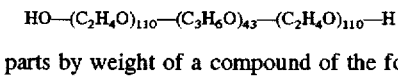

and 18.6 parts by weight of 1,3,6-hexamethylene triisocyanate were used. Thus, a pale yellowish solid product was obtained. This product is called Viscosity Conditioner 21 (R: ethylene group; R': 2-octyldodecyl group; $R^1$: hexanetriyl group; $R^2$: $(C_3H_6O)_{21}$—$(C_2H_4O)_{110}$; $R^3$: propylene group; h=2; m=2; n=10).

Production Example 22

The process for Production Example 10 was followed except that use was made of 420 parts by weight of PEG 6000, 283 parts by weight of an adduct of a branched alcohol of the formula

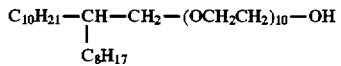

with 20 mols of EO, and 72.7 parts by weight of a triisocyanate prepared from 1 mol of trimethylolpropane and 13 mols of HMDI. Thus, a pale yellowish solid product was obtained. This product is called Viscosity Conditioner 22 (R: ethylene group; R': 2-decyltetradecyl group; $R^1$: trimethylolpropane-HMDI moiety; $R^2$: ethylene group; $R^3$: ethylene group; h=2; m=2; k=67; n=20).

Production Example 23

The process for Production Example 10 was followed except that use was made of 43.5 parts by weight of an adduct of trimethylolpropane with 35 mols of EO, 578 parts by weight of an adduct of a branched alcohol of the formula

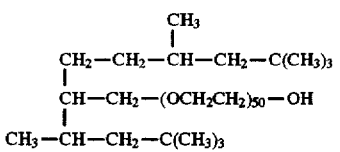

with 50 mols of EO, and 64.9 parts by weight of a tetraisocyanate derived from 1 mol of pentaerythritol and 4 mols of TDI. Thus, a pale yellowish solid product was obtained. This product is called Viscosity Conditioner 23 (R: ethylene group; $R^1$: pentaerythritol-TDI moiety; $R^2$: ethylene group; $R^3$: trimethylolpropane moiety; h=3; m=3; k=35; n=50).

Production Example 24

The process for Production Example 10 was followed except that use was made of 200 parts by weight of PEG 20000, 464 parts by weight of an adduct of a branched alcohol of the formula

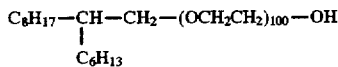

with 100 mols of EO, and 24.4 parts by weight of a hexaisocyanate derived from 1 mol of dipentaerythritol and 6 mols of HMDI. Thus, a pale yellowish solid product was obtained. This product is called Viscosity Conditioner 24 (R: ethylene group; R': 2-hexyldecyl group; $R^1$: dipentaerythritol-HMDI moiety; $R^2$: ethylene group; $R^3$: ethylene group; h=5; m=2; k=226; n=100).

Comparative Production Example 4

Into a 4-necked flask of 1,000 ml in volume equipped with a thermometer, a nitrogen inlet and a stirrer were charged 534 parts by weight of PEG 6000, and 133 parts by weight of an adduct of stearyl alcohol with 10 mols of EO. The reactive system was dehydrated in vacuo (below 10 mm Hg) at 90° to 100° C. for 3 hours until the moisture in the system was lowered to 0.03%. Upon cooling of the reactive system to 80° C., 32.8 parts by weight of HMDI was placed in the flask. Reaction was then effected in a nitrogen stream at 80° to 90° C. for 2 hours, after which the isocyanate content was confirmed to be nil. Thus, a comparative reaction product was obtained which was a pale yellowish solid at normal temperature. This product is hereunder called Comparative Product 4.

Comparative Production Example 5

The process for Comparative Production Example 4 was followed except that 580 parts by weight of PEG 20000, 107 parts by weight of an adduct of nonylphenol with 35 mols of EO, and 11.1 parts by weight of TDI. Thus, a pale yellowish solid product was obtained. This product is called Comparative Product 5.

Comparative Production Example 6

The process for Comparative Production Example 4 was followed except that 168 parts by weight of PEG 6000, 505 parts by weight of an adduct of nonylphenol with 200 mols of EO, and 9.4 parts by weight of HMDI were used. Thus, a pale yellowish solid product was obtained. This product is called Comparative Product 6.

Comparative Production Example 7

The process for Comparative Production Example 4 was followed except that 441 parts of a compound of the formula

292 parts by weight of an adduct of lauryl alcohol with 50 mols of EO and also with 10 mols of PO, and 16.5 parts by weight of HMDI were used. Thus, a pale yellowish solid product was obtained. This product is called Comparative Product 7.

Comparative Production Example 8

The process for Comparative Production Example 4 was followed except that 397 parts by weight of an adduct of trimethylol-propane with 50 mols of EO, 241 parts by weight of an adduct of stearyl alcohol with 10 mols of EO, and 59.8 parts by weight of TDI were used. Thus, a pale yellowish solid product was obtained. This product is called Comparative Product 8.

An amount of 40 parts by weight of each of Viscosity Conditioners 10 to 24 according to the present invention and of Comparative Products 4 to 8 was mixed in uniform condition with 10 parts by weight of butyl Cellosolve (ethylene glycol monobutyl ether) and 50 parts by weight of water, whereupon there was provided a transparent liquid composition, namely each of Compositions 10 to 24 and of Comparative Compositions 4 to 8. The viscosities of these test compositions are indicated below.

Composition 10: about 4,500 cPs
Composition 11: about 4,000 cPs
Composition 12: about 7,500 cPs
Composition 13: about 5,000 cPs
Composition 14: about 5,500 cPs
Composition 15: about 5,000 cPs
Composition 16: about 4,000 cPs
Composition 17: about 4,500 cPs
Composition 18: about 5,500 cPs
Composition 19: about 5,500 cPs
Composition 20: about 4,000 cPs
Composition 21: about 5,500 cPs
Composition 22: about 4,500 cPs
Composition 23: about 6,000 cPs
Composition 24: about 7,000 cPs
Comparative Composition 4: about 2,000 cPs
Comparative Composition 5: about 2,500 cPs
Comparative Composition 6 about 6,000 cPs
Comparative Composition 7: about 4,500 cPs
Comparative Composition 8: about 3,000 cPs Example 5

Evaluation with Emulsions

| Formulation: | |
|---|---|
| emulsion | 100.0 g |
| (for gloss coating; acrylate ester type; commercially available) | |
| viscosity conditioner | 0.5 g |
| (each of inventive and comparative products; aqueous solution of 10% in solid content) | |
| anti-foaming agent | 0.2 g |
| (Adekanate B-940; mineral oil type; Asahi Denka Kogyo K.K.) | |

The above formulation was hand-stirred for 5 minutes, followed by mechanical stirring (at 1,000 rpm). After being allowed to stand for 2 hours at each of three selected temperatures (5°, 25° and 40° C.), the resulting emulsion compositions, inventive compositions 10 to 24 and comparative compositions 4 to 8, were measured in respect of their viscosities. The measurement was made under a set of conditions given below:

viscometer: BM viscometer
rotor: No. 4 revolution: 12 rpm
The results are shown in Table 6.

TABLE 6

| viscosity conditioner | 5° C. (cPs) | 25° C. (cPs) | 40° C. (cPs) | 40° C./5° C. |
|---|---|---|---|---|
| Composition 10 | 11,000 | 9,200 | 8,000 | 0.73 |
| Composition 11 | 11,500 | 10,200 | 10,200 | 0.89 |
| Composition 12 | 8,500 | 7,400 | 6,000 | 0.71 |
| Composition 13 | 6,800 | 6,800 | 6,700 | 0.99 |
| Composition 14 | 7,900 | 7,500 | 6,900 | 0.87 |
| Composition 15 | 15,400 | 13,500 | 13,000 | 0.84 |
| Composition 16 | 6,000 | 5,800 | 5,500 | 0.92 |
| Composition 17 | 4,000 | 3,800 | 3,700 | 0.93 |
| Composition 18 | 7,100 | 6,900 | 6,500 | 0.92 |
| Composition 19 | 9,800 | 9,800 | 9,700 | 0.99 |
| Composition 20 | 3,500 | 3,400 | 3,400 | 0.97 |
| Composition 21 | 10,000 | 9,700 | 9,000 | 0.90 |
| Composition 22 | 3,300 | 3,100 | 3,100 | 0.94 |
| Composition 23 | 12,800 | 12,800 | 12,000 | 0.94 |
| Composition 24 | 5,600 | 5,500 | 5,100 | 0.91 |
| Comparative Composition 4 | 8,300 | 5,100 | 3,100 | 0.37 |
| Comparative Composition 5 | 9,700 | 6,000 | 4,200 | 0.43 |
| Comparative Composition 6 | 11,000 | 6,000 | 2,500 | 0.23 |
| Comparative Composition 7 | 7,500 | 3,000 | 1,300 | 0.17 |
| Comparative Composition 8 | 6,500 | 1,000 | 530 | 0.08 |

The above testing was repeated with the exception of use of a different emulsion for use in elastic coating (styrene-acrylate ester type; commercially available) and a different grade of anti-foaming agent (Adekanate B-190; silicone type; Asahi Denka Kogyo K.K.). The results are listed in Table 7.

TABLE 7

| viscosity conditioner | 5° C. (cPs) | 25° C. (cPs) | 40° C. (cPs) | 40° C./5° C. |
|---|---|---|---|---|
| Composition 10 | 26,000 | 25,700 | 23,100 | 0.89 |
| Composition 11 | 19,800 | 19,000 | 17,100 | 0.86 |
| Composition 12 | 20,200 | 19,800 | 17,200 | 0.85 |
| Composition 13 | 23,300 | 23,000 | 22,400 | 0.96 |
| Composition 14 | 23,000 | 22,800 | 22,600 | 0.98 |
| Composition 15 | 38,400 | 38,400 | 37,000 | 0.96 |
| Composition 16 | 41,000 | 38,200 | 38,000 | 0.93 |
| Composition 17 | 48,000 | 48,000 | 47,100 | 0.98 |
| Composition 18 | 27,500 | 27,000 | 25,500 | 0.93 |
| Composition 19 | 55,300 | 53,800 | 53,300 | 0.96 |
| Composition 20 | 21,000 | 20,800 | 19,900 | 0.95 |
| Composition 21 | 43,300 | 42,800 | 42,500 | 0.98 |
| Composition 22 | 62,100 | 61,600 | 60,900 | 0.98 |
| Composition 23 | 51,300 | 50,500 | 50,500 | 0.98 |
| Composition 24 | 33,200 | 32,500 | 32,400 | 0.98 |
| Comparative Composition 4 | 27,800 | 12,300 | 10,000 | 0.36 |
| Comparative Composition 5 | 31,200 | 10,600 | 3,300 | 0.11 |
| Comparative Composition 6 | 35,300 | 21,000 | 9,500 | 0.27 |
| Comparative Composition 7 | 41,000 | 13,000 | 3,500 | 0.09 |
| Comparative Composition 8 | 38,300 | 22,000 | 5,900 | 0.15 |

Example 6

Evaluation with Elastic Paints

Formulation:

| | |
|---|---|
| water | 90 parts by weight |
| viscosity conditioner (each of inventive and comparative products) | 70 parts by weight |
| pigment dispersant (25% polycarboxylic acid type) | 10 parts by weight |
| anti-freeze agent (ethylene glycol) | 20 parts by weight |
| anti-foaming agent (Adekanate B-940; Asahi Denka Kogyo K.K.) | 2 parts by weight |
| titanium oxide | 140 parts by weight |
| calcium carbonate | 160 parts by weight |

The mixture thus formulated was stirred for 24 hours and eventually used as a mill base. This base was then formulated as below.

Formulation:

| | |
|---|---|
| millbase | 493 parts by weight |
| emulsion (for elastic coating; styrene-acrylate ester type; available in commerce) | 410 parts by weight |
| anti-foaming agent (Adekanate B-190) | 3 parts by weight |

Stirring was done for 5 hours, and each of the finished paints was let to stand for 2 hours at three different temperatures (5°, 25° and 40° C.) and then checked for viscosities under the following set of conditions:
viscometer: BM viscometer
rotor: No. 4
revolution: 30 rpm
The results are shown in Table 8.

TABLE 8

| viscosity conditioner | 5° C. (cPs) | 25° C. (cPs) | 40° C. (cPs) | 40° C./5° C. |
|---|---|---|---|---|
| Composition 10 | 41,000 | 39,300 | 36,500 | 0.89 |
| Composition 11 | 25,200 | 24,600 | 22,100 | 0.88 |
| Composition 12 | 39,300 | 29,200 | 27,500 | 0.70 |
| Composition 13 | 15,100 | 14,800 | 14,000 | 0.93 |
| Composition 14 | 22,100 | 21,900 | 19,800 | 0.90 |
| Composition 15 | 33,500 | 32,000 | 30,800 | 0.92 |
| Composition 16 | 65,300 | 65,000 | 65,000 | 1.00 |
| Composition 17 | 72,100 | 70,000 | 68,800 | 0.95 |
| Composition 18 | 55,300 | 53,300 | 53,300 | 0.96 |
| Composition 19 | 66,800 | 65,000 | 63,200 | 0.95 |
| Composition 20 | 48,200 | 48,200 | 47,900 | 0.99 |
| Composition 21 | 76,800 | 75,600 | 75,500 | 0.98 |
| Composition 22 | 35,800 | 35,800 | 34,500 | 0.96 |
| Composition 23 | 91,500 | 90,800 | 89,600 | 0.98 |
| Composition 24 | 44,300 | 43,500 | 42,900 | 0.97 |
| Comparative Composition 4 | 21,700 | 15,900 | 7,600 | 0.35 |
| Comparative Composition 5 | 32,300 | 23,000 | 12,300 | 0.38 |
| Comparative Composition 6 | 45,100 | 30,000 | 16,000 | 0.35 |
| Comparative Composition 7 | 41,800 | 22,000 | 9,500 | 0.23 |
| Comparative Composition 8 | 62,200 | 28,500 | 11,100 | 0.18 |

As evidenced from Examples 5 and 6 above, Viscosity Conditioners 10 to 24 of the present invention produce those emulsions which are less susceptible to viscosity changes with temperature. This is because such viscosity conditioners were produced by the use of a selected class of branched or secondary alcohols as starting materials with eventual chemical attachment of a branched chain or a secondary hydrocarbon chain to the group R'. By contrast, Comparative Products 4 to 8 in common use involved great changes in viscosity with temperature since the products were prepared by the use of straight alcohols as starting materials and thus were configured to be terminated by a straight hydrocarbon chain.

Example 7

Color Toning and Water Resistance with Emulsions

Furthermore, the following testing was performed to evaluate performance of the viscosity conditioner of the present invention when used for an emulsion paint.

| Formulation: | |
|---|---|
| emulsion (acrylate ester type) | 40.0 g |
| black pigment | 0.8 g |
| anti-foaming agent (Adekanate B-940) | 0.1 g |

Hand mixing of this formulation was done for 1 minute, followed by homogenization through mechanical stirring with a large turbine impeller for 10 to 20 minutes at 1,000 to 2,000 rpm. The resultant emulsion was coated over a slate plate.

Color toning was adjudged in respect of any appreciable color changes at three points of the emulsion, i.e., (1) wet-on-wet coating, (2) coated surface texture upon finger rubbing and (3) coat sagging, as compared to the coated surface obtained with a single coating.

Water resistance was determined by inspecting the state of the coat after being immersed in a warm water of 50° C. for 24 hours.

The results are listed in Table 9 in which the symbol "o" is taken as "not different", "Δ" as "slightly different" and "x" as "largely different".

TABLE 9

| viscosity conditioner | color tone | | | water resistance |
|---|---|---|---|---|
| | point 1 | point 2 | point 3 | |
| Composition 10 | o | o | o | not different |
| Composition 11 | o | o | o | not different |
| Composition 12 | o | o | o | not different |
| Composition 13 | o | o | o | not different |
| Composition 14 | o | o | o | not different |
| Composition 15 | o | o | o | not different |
| Composition 16 | o | o | o | not different |
| Composition 17 | o | o | o | not different |
| Composition 18 | o | o | o | not different |
| Composition 19 | o | o | o | not different |
| Composition 20 | o | o | o | not different |
| Composition 21 | o | o | o | not different |
| Composition 22 | o | o | o | not different |
| Composition 23 | o | o | o | not different |
| Composition 24 | o | o | o | not different |
| Comparative Composition 4 | Δ | o | x | slightly blistered |
| Comparative Composition 5 | x | Δ | o | greatly blistered |
| Comparative Composition 6 | x | x | Δ | greatly blistered |
| Comparative Composition 7 | x | Δ | x | slightly blistered |
| Comparative Composition 8 | o | Δ | x | greatly blistered |

Example 8

Color Toning and Water Resistance with Paints

| Formulation: | |
|---|---|
| paint used in Example 6 | 40.0 g |
| black pigment | 0.8 g |
| anti-foaming agent (Adekanate B-940) | 0.1 g |

Hand mixing of this formulation was done for 1 minute, followed by homogenization through mechanical stirring with a large turbine impeller for 10 to 20 minutes at 1,000 to 2,000 rpm. The resultant emulsion was coated over a slate plate.

Color toning was adjudged in respect of any appreciable color changes at three points of the emulsion, i.e., (1) wet-on-wet coating, (2) coated surface texture upon finger rubbing and (3) coat sagging, as compared to the coated surface obtained with a single coating.

Water resistance was determined by inspecting the state of the coat after being immersed in a warm water of 50° C. for 24 hours.

The results are listed in Table 10 in which the symbol "o" is taken as "not different", "Δ" as "slightly different" and "x" as "largely different".

TABLE 10

| viscosity conditioner | color tone | | | water resistance |
|---|---|---|---|---|
| | point 1 | point 2 | point 3 | |
| Composition 10 | o | o | o | not different |
| Composition 11 | o | o | o | not different |
| Composition 12 | o | o | o | not different |
| Composition 13 | o | o | o | not different |
| Composition 14 | o | o | o | not different |
| Composition 15 | o | o | o | not different |
| Composition 16 | o | o | o | not different |
| Composition 17 | o | o | o | not different |
| Composition 18 | o | o | o | not different |
| Composition 19 | o | o | o | not different |
| Composition 20 | o | o | o | not different |
| Composition 21 | o | o | o | not different |
| Composition 22 | o | o | o | not different |
| Composition 23 | o | o | o | not different |
| Composition 24 | o | o | o | not different |
| Comparative Composition 4 | x | Δ | o | slightly blistered |
| Comparative Composition 5 | Δ | x | x | slightly blistered |
| Comparative Composition 6 | o | x | x | greatly blistered |
| Comparative Composition 7 | Δ | x | Δ | slightly blistered |
| Comparative Composition 8 | x | x | o | greatly blistered |

As is apparent from Examples 7 and 8 above, Viscosity Conditioners 10 to 24 of the present invention are physically excellent for use in emulsion paints.

What is claimed is:

1. A viscosity conditioner comprising a compound of the formula represented by the following formula:

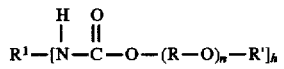

$$R^1-[N-C-O-(R-O)_n-R']_h$$

where R is a hydrocarbyl group, R' is a branched or secondary hydrocarbyl group, $R^1$ is a hydrocarbyl group which may contain a urethane linkage, n ranges from 1 to 500, and h is not less than 1.

2. The viscosity conditioner according to claim 1, wherein the group R' is a group remaining after an isocyanate group or groups have been removed from mono- or polyisocyanate of $R^1-(NCO)_h$.

3. The viscosity conditioner according to claim 2, wherein the polyisocyanate of $R^1-(NCO)_h$ is derived from reaction of a divalent to hexavalent polyol and a divalent to tetravalent polyisocyanate and has a urethane linkage in its molecule.

4. The viscosity conditioner according to claim 1, wherein the group R is an alkylene group of 2 to 4 carbon atoms.

5. The viscosity conditioner according to claim 1, wherein the group R' is a branched alkyl group of the following formula:

$$R^4-CH-R^6-$$
$$|$$
$$R^5$$

where $R^4$, $R^5$ and $R^6$ are each a hydrocarbyl group; or a secondary alkyl group of the following formula:

$$R^7-CH-$$
$$|$$
$$R^8$$

where $R^7$ and $R^8$ are each a hydrocarbyl group.

6. The viscosity conditioner according to claim 5, wherein the groups $R^4$, $R^5$, $R^7$ and $R^8$ are each a hydrocarbon group having a carbon number of 4 or greater, and $R^6$ is —$CH_2$—.

7. A viscosity conditioner resulting from reaction of at least one mono- or poly-isocyanate of the formula $R^1$—$(NCO)_h$ and at least one polyether monoalcohol of the formula R'—(O—R)$_n$—OH, wherein R is a hydrocarbyl group, R' is a branched or secondary hydrocarbyl group, $R^1$ is a hydrocarbyl group which may contain a urethane linkage, n ranges from 1 to 500, and h is not less than 1.

8. A viscosity conditioner comprising a compound of the following formula:

$$R^3-\{(O-R^2)_k-OCN-R^1-[N-C-O-(R-O)_n-R']_h\}_m$$

where R, $R^2$ and $R^3$ are each a hydrocarbyl group, R' is a branched or secondary hydrocarbyl group, $R^1$ is a hydrocarbyl group which may contain a urethane linkage, n and k each range from 1 to 500, m is not less than 2, and h is not less than 1.

9. The viscosity conditioner according to claim 8, wherein R and $R^2$ may each be identical or different and are an alkylene group of 2 to 4 carbon atoms or a phenyl-ethylene group.

10. The viscosity conditioner according to claim 8, wherein the group $R^1$ is a residue of a polyisocyanate of the formula $R^1$—$(NCO)_{h+1}$.

11. The viscosity conditioner according to claim 10, wherein the polyisocyanate of the formula $R^1$—$(NCO)_{h+1}$ results from reaction of a divalent to octavalent polyol and a divalent to tetravalent polyisocyanate and has a urethane linkage in its molecule.

12. The viscosity conditioner according to claim 8, wherein the group $R^3$ is a residue of a polyol of $R^3$—$(OH)_m$.

13. The viscosity conditioner according to claim 8, wherein the group R' is a branched alkyl group of the following formula:

$$R^7-CH-R^6-$$
$$|$$
$$R^5$$

where $R^4$, $R^5$ and $R^6$ are each a hydrocarbyl group; or a secondary alkyl group of the following formula:

$$R^7-CH-$$
$$|$$
$$R^8$$

wherein $R^7$ and $R^8$ are each a hydrocarbyl group.

14. The viscosity conditioner according to claim 13, wherein the groups $R^4$, $R^5$, $R^7$ and $R^8$ are each a hydrocarbyl group having a carbon number of 4 or greater, and $R^6$ is —$CH_2$—.

15. A viscosity conditioner resulting from reaction of at least one polyether polyol of the formula $R^3$—$[(O-R^2)_k$—$OH]_m$, at least one polyisocyanate of the formula $R^1$—$(NCO)_{h+1}$ and at least one polyether monoalcohol of the formula HO—(R—O)$_n$R', wherein R, $R^2$ and $R^3$ are each a hydrocarbyl group, R' is a branched or secondary hydrocarbyl group, $R^1$ is a hydrocarbyl group which may contain a urethane linkage, n and k each range from 1 to 500, m is not less than 2, and hi is not less than 1.

16. The viscosity conditioner according to claim 15, wherein three different starting materials for use as the polyether polyol, polyisocyanate and polyether monoalcohol are reacted in an NCO/OH ratio of 0.8:1 to 1.4:1.

17. An emulsion composition comprising, as an essential component, the viscosity conditioner claim 1.

18. An emulsion composition comprising, as an essential component, the viscosity conditioner of claim 7.

19. An emulsion composition comprising, as an essential component, the viscosity conditioner of claim 8.

20. An emulsion composition comprising, as an essential component, the viscosity conditioner of claim 15.

21. An emulsion paint composition comprising, as an essential component, the viscosity conditioner of claim 1.

22. An emulsion paint composition comprising, as an essential component, the viscosity conditioner of claim 7.

23. An emulsion paint composition comprising, as an essential component, the viscosity conditioner of claim 8.

24. An emulsion paint compostion comprising, as an essential component, the viscosity conditioner of claim 15.

* * * * *